July 11, 1961 V. E. KNAPP ET AL 2,991,877
MECHANISM FOR CLADDING ARTICLE
Filed March 20, 1958 2 Sheets-Sheet 1
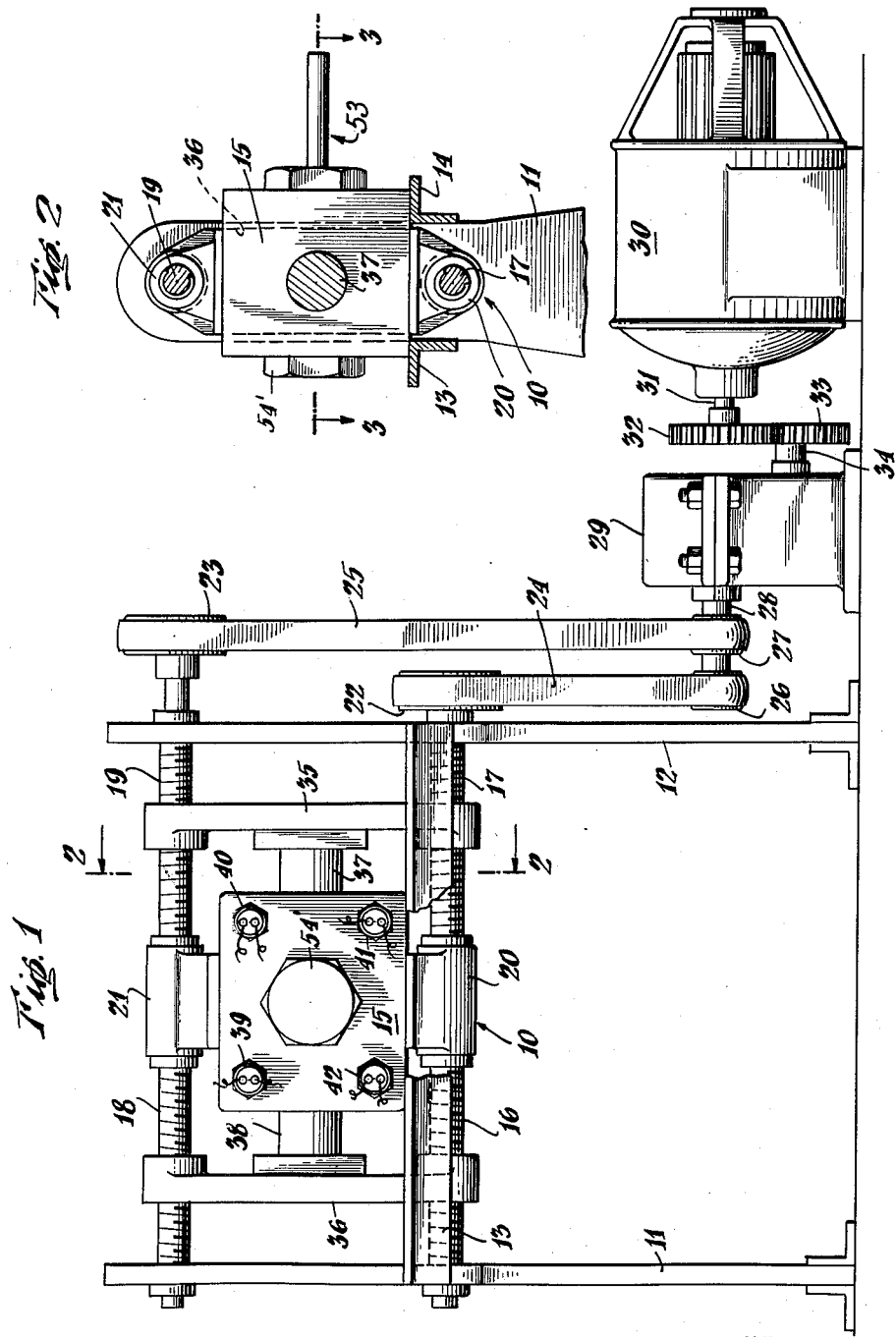
INVENTORS
Otto F. Schmidt
BY Victor E. Knapp
Norman D. Holland
ATTORNEY July 11, 1961

V. E. KNAPP ET AL 2,991,877

MECHANISM FOR CLADDING ARTICLE

Filed March 20, 1958

INVENTORS
Otto F. Schmidt
BY Victor E. Knapp

ATTORNEY

United States Patent Office

2,991,877
Patented July 11, 1961

2,991,877
MECHANISM FOR CLADDING ARTICLE
Victor E. Knapp, Roslyn, N.Y., and Otto F. Schmidt, Wilmington, Del., assignors to Knapp Mills Incorporated, Long Island City, N.Y., a corporation of New York
Filed Mar. 20, 1958, Ser. No. 734,067
3 Claims. (Cl. 207—4)

The present invention relates to a mechanism and method for lead cladding articles such as rods, wire, pipes, tubes and the like, and, particularly, to a mechanism and method for bonding a coating of lead to rods, wire, pipes, tubes and the like. This application is a continuation-in-part of our pending prior application Serial No. 438,431 filed June 22, 1954, now abandoned entitled "Apparatus for Forming Materials."

The cladding of pipes, rods, tubes and the like by extrusion of lead is known in the art and devices have been developed for attaining this end. These prior cladding systems, however, have not been satisfactory since many of them entail complicated and expensive equipment and in many instances have not been found to produce as uniform and dense a clad as may be desired. In many cases these prior devices have not achieved a firm bond between the base material and the clad that will effectively prevent the admission of corrosive fluids therebetween with the result that sometimes much of the usefulness of the lead clad is lost.

In such prior cladding systems, it has been found difficult to synchronize the movement of the rod through the cladding mechanism with the rate of extrusion of the cladding material so that a uniform and homogeneous clad cannot easily be obtained.

An object of this invention is to overcome difficulties of these prior systems and to provide a simple and effective apparatus for attaining highly dense lead clads that can be formed in continuous lengths without the formation of joints or imperfections in the clad by reason of interruptions in the operation to refill the apparatus with the lead used to fabricate such clad.

Another object of the invention resides in the provision of improved lead cladding equipment that will function equally well over a relatively wide range of article sizes and which will facilitate the attainment of a firm mechanical and chemical bond between the lead clad and the base material.

A further object of the invention resides in the provision of lead cladding apparatus wherein the die and point which determine the thickness of the lead clad are arranged and designed to provide a smoothly formed clad having relatively high density and which at the same time may be formed into a relatively simple, highly compact unit.

A still further object of the invention is a new and improved apparatus for lead cladding pipes, tubes, rods, wire and the like which may be formed of steel, copper or other similar materials and which produces a firm and positive bond between the lead clad and the article being clad.

A still further object of the present invention is the provision of a lead cladding mechanism in which the movement of the rod or tube through the cladding mechanism will be synchronized with the rate of extrusion of the cladding material to form a uniform and homogeneous lead clad, without the use of any separate or complicated synchronizing mechanisms.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is an elevational view of the cladding apparatus in accordance with this invention;

FIG. 2 is a cross sectional view of the apparatus shown in FIG. 1 and taken along the line 2—2 thereof;

FIG. 3 is a cross sectional view taken along line 3—3 of FIG. 2 showing the apparatus with extrusion dies therein to be used for forming pipes and tubes and FIG. 4 is a cross sectional view of the extrusion block as shown in FIG. 3 with the extrusion dies replaced by cladding dies to be used for lead cladding rods, wire, tubes, pipes and the like.

Figure 3:
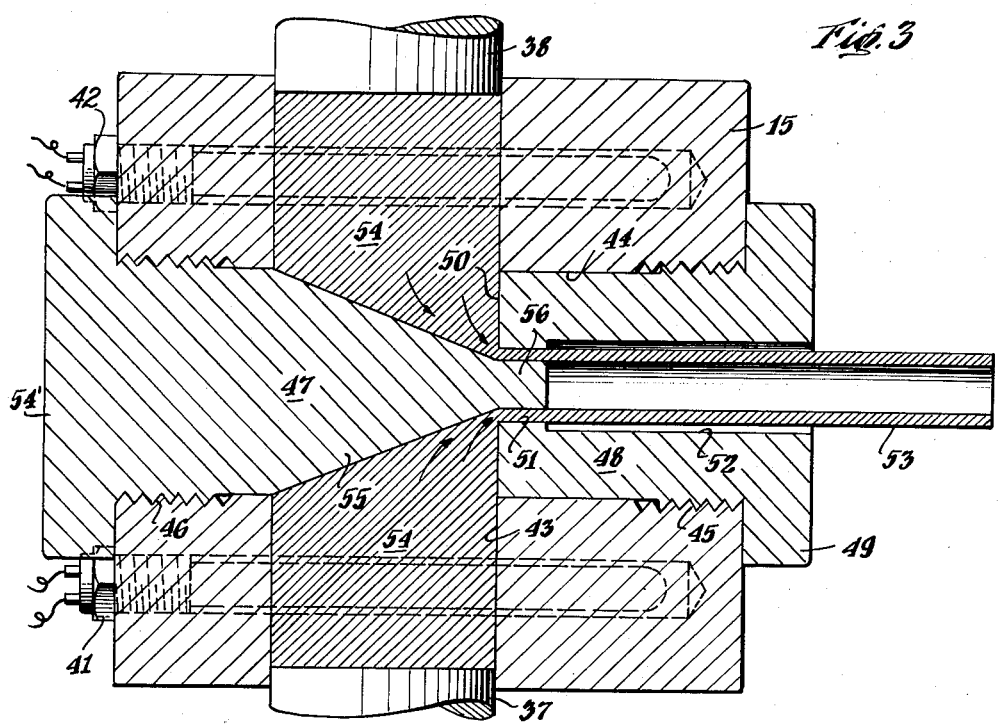

The extrusion of lead to form clads on tubes and rods has presented many difficult problems. Though many procedures and devices have been devised in order to meet the needs of industry they have not been found satisfactory and very often have been too complicated and expensive for general commercial use. The invention now to be described overcomes these problems and enables the production of a highly improved lead clad at relatively low cost.

Referring now to the drawings and particularly FIGS. 1 and 2, the cladding machine is broadly denoted by the numeral 10 and is provided with a pair of upright frame members 11 and 12 connected one to the other by a pair of transverse frame members 13 and 14 of angular section. These members may be either welded or bolted to the upright frame members 11 and 12 and in addition to their normal structural function act as guides for supporting the cladding block 15 disposed centrally of the frame members 11 and 12.

The cladding block 15 is maintained centrally of the frame members 11 and 12 by means of four lead screws 16, 17, 18 and 19 pivotally mounted at their outer ends to the frame members 11 and 12 and engaging journals 20 and 21 secured to the lower and upper surfaces of the cladding block 15. Actually the lower lead screws 16 and 17 may either comprise a unitary member extending through the journal 20 with the journal being held so that it rides centrally thereof or these lead screws may be independently pivoted within the journal 20 and coupled one to the other by a suitable coupling means disposed therebetween. The lead screws 18 and 19 may be fashioned in a similar manner and coordinated with the journal 21 so that it will be maintained in a central position between the frame members 11 and 12 at all times.

The lead screws 17 and 19 preferably extend through and beyond the frame member 12 for carrying pulleys 22 and 23, respectively. The pulley 22, which is coupled to the lead screw 17, is mounted fairly close to the outside face of the frame member 12 while the pulley 23 carried by the lead screw 19 is spaced away from the base of frame member 12 so that its cooperating belt 25 will not interfere with the operation of the pulley 22. The belt 24, which engages pulley 22, and the belt 25, which engages pulley 23, are driven respectively by pulleys 26 and 27 fixedly carried on a shaft extending outwardly from a suitable speed reducing mechanism 29. While any suitable source of power may be employed for driving the apparatus, for the purposes of this disclosure an electric motor 30 has been illustrated. The motor shaft 31 of motor 30 is provided with a spur gear 32 which meshes with a second spur gear 33 carried on a shaft 34 extending from the right hand side of the speed reducer 29 as observed in FIG. 1. Rotation of the motor will therefore be transmitted through the speed reducer 29 and to the pulleys 22 and 23 which are of like diameter and driven at identical speeds. This action will rotate the lead screws 16, 17, 18 and 19 in one direction or the other according to the direction of rotation of the motor.

The operation of these lead screws functions to displace a pair of carriages 35 and 36 toward or away from the cladding block 15 depending on the direction of this rotation. In this particular embodiment of the invention, the lead screws 17 and 19 are provided with right hand threads and function to support and transport the carriage 35. When viewed from the left side of the drawing, counterclockwise rotation of these lead screws will move the carriage 35 to the left and carry with it a plunger 37 which is secured centrally of the carriage and extends into an opening in the side of the cladding block 15 as will be described. Clockwise rotation of the lead screws 17 and 19 will move the carriage 35 to the right or away from the cladding block 15. In the case of the lead screws 16 and 18 which are provided with left hand threads, the reverse will obtain. Thus clockwise rotation of the lead screws will move the carriage 36 to the left as shown in FIG. 1 and vice versa. The carriage 36 is similar to carriage 35 and also carries a central plunger member 38 which engages an opening in the left hand side of the cladding block 15.

In the cladding of lead with the apparatus as shown in FIG. 1 it is desirable to maintain the temperature of the cladding block 15 within certain limits in order to maintain the lead at the desired degree of plasticity. To attain this end the cladding block 15 is preferably heated by gas or electricity and is also provided with suitable temperature control apparatus. In the case of electrical heating four heaters 39 to 42 (FIGS. 1, 3 and 4) may be employed and positioned within the block at points above and below the points of entrance of plungers 37 and 38 into the block 15. These heaters may be connected in any suitable manner depending upon the character and type of heating elements employed. A suitable thermostatic element may also be positioned at any suitable place in or on the extrusion block 15 that will record the temperature of the material being extruded and control the application of heating energy in accordance therewith.

Figure 4:
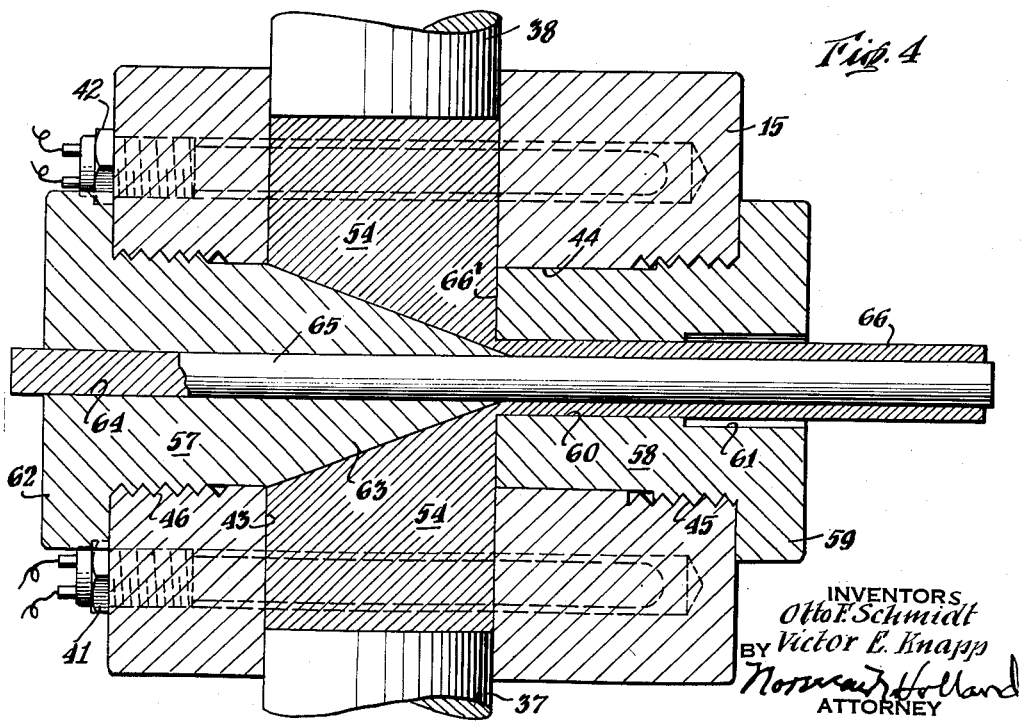

Referring now to FIG. 4 which shows a cross sectional view of the cladding block 15, it is essentially in the shape of a cube and is provided with an opening 43 extending transversely thereof. This opening is of the size and shape adapted to slidably receive the plungers or rams 37 and 38 as described in connection with FIG. 1. In addition to this transverse opening 43, the block also includes a second opening 44 perpendicular to and intersecting the opening 43, i.e., their axes are mutually perpendicular. The ends of this opening 44 are threaded as shown at 45 and 46 to receive the male and female die parts 57 and 58 by means of which cladding of pipes, rods and tubes is effected. The female die part 58 is in the form of a plug having a flanged outer portion 59 preferably of hexagonal section to facilitate tightening it in position within the right hand end of the opening 44. The inner surface 66' of this plug or female die member 58 is flat and arranged to lie in a plane with the right hand edge of the opening 43. It is further provided with a central opening having a narrowed section 60 which, as will be observed, defines the outside diameter of the lead clad to be formed and an outer section 61 of enlarged diameter which merely guides the clad rod or tube 65 to be clad is inserted. The male die part 57 is fabricated in a manner somewhat similar to the female die part 58 in that it is provided with a flanged hexagonal part 62 for use in firmly securing it within the block 15 by cooperation with the threads 46 in the opening 44. The male die part 57 has a longitudinal opening 64 therein through which a rod or tube 65 to be clad is inserted. The male die part 57 has a generally conical section 63 coming to a sharp annular edge extending from the left hand edge of the opening 43 to the right hand edge as shown in FIG. 4. This conical section 63 extends into the female die part opening 60.

In cladding rods, wire and tubes with lead, the relationship between the end of conical section 63 of the male die and the central opening 60 in the female die is important. In practice, the best results were obtained with the end of conical section 63 of the male die extending into the female die opening 60 a distance of $\frac{1}{32}$ of an inch. This amount of overlap has been found to provide a clad of uniform thickness with a secure bond to the rod or tube with clad thicknesses of $\frac{3}{16}$ to $\frac{1}{4}$ of an inch. Within reasonable limits, variations in thickness of the clad do not require changes in the position of the male die.

In the operation of this form of the invention the lead screws 16 and 19 (FIGS. 1 and 2) are operated to withdraw the plungers 37 and 38 completely from the opening 43. Preformed blocks or slugs of lead 54 to be used for the cladding are then inserted in the opening 43 from each side of the block 15 whereupon the motor 30 is operated to move the plungers into their respective openings and against the lead inserts 54. At the same time the block 15 is heated to a temperature of the order of 550 to 580 degrees Fahrenheit to melt the lead into a plastic state, but not sufficient to melt it to a molten state. If desired, molten lead can be poured in the passageway 43 and permitted to set to a plastic state. The plungers 37 and 38 are then moved inwardly toward each other under pressures of the order of 300 to 1000 tons per square inch. Since the lead is in a somewhat semi-plastic state, like putty, it will be forced outwardly between the end of conical portion 63 of the male die 57 and the surrounding wall 60 of the female die part 58 to form the lead clad or coating 66 on the rod or tube 65. The pressure exerted by the lead on the rod or tube 65 pushes the rod along the die parts as it is being bonded thereto. Thus, the present invention automatically feeds the rod 65 without the necessity of having the rod pushed or pulled by any other mechanism. This enables the lead clad 66 to be bonded to the rod 65 uniformly and homogeneously.

The fact that the end of conical portion 63 of the male die extends into the female die for $\frac{1}{32}$ of an inch insures a continuous and uniform clad on the rod 65 and permits the lead to be bonded to the rod 65 firmly and homogeneously.

While a given length of rod can be clad from one set of lead slugs 54, rods of any desired length may be clad merely by halting the machine and inserting additional slugs of lead 54. This permits the new lead slugs to be amalgamated with the older lead so that no break or joint in the clad will be produced and enables the attainment of a uniform lead clad free of imperfections.

Through the formation of the die parts in the manner illustrated in the drawing and described herein, it has been found that a dense well bonded clad is provided and further that the quality of this bond is a function of the length of the reduced female die part opening section 60 through which the lead is formed about the pipe or tube. The length of this reduced section should preferably not exceed eight times the diameter of the pipe or tube being clad. In cases of pipes ranging from $\frac{1}{4}$ inch in diameter to $1\frac{1}{2}$ inches in diameter section 60 should preferably be about two inches in length.

The method and apparatus for applying clads as previously described can also be used to attain both a firm mechanical as well as chemical bond to the tube. In this case the tube or rod to be coated is first cleaned and coated with a thin layer of solder comprising tin, lead or antimonial lead which has been firmly bonded through the use of suitable fluxes such as zinc chloride, stantus chloride or the like. Ordinary solder comprising 50% tin and 50% lead has been found satisfactory, however, other proportions can be used, as may be desired. The solder may be applied by passing the rod 65 through a bath of tin and lead (not shown) after the flux is applied to it, or the rod 65 can be heated first and the solder and flux could be applied by brushes. Upon the preparation of the rod or tube in this manner, it is then inserted into the opening 64 in the male die 57 and the cladding process is carried out in the manner previously described. In this way the outer clad actually fuses with and becomes bonded to the preliminary coating by reason of the high pressure and controlled temperature employed. The prepared temperature range of 550 to 580 degrees Fahrenheit recited above is sufficient to melt the solder and form a firm bond with the rod 65. In effect the lead clad and the undercoating actually form a unitary body of clad chemically and mechanically bonded to the pipe or tube 65.

In cases where light wall tubes are to be coated it may be desirable to insert a steel mandrel within the tube to prevent it from collapsing under the extrusion pressures.

Substantially the same process may be employed in the formation of a lead pipe by replacing the male and female die parts 57 and 58 as illustrated in FIG. 4 with extruding die parts denoted by the numerals 47 and 48 in FIG. 3. The female die part 48 corresponds substantially to the die part 58 of FIG. 4 in that it is provided with a flanged hexagonal outer portion 49 for securing it in the block 15 by means of suitable threads cooperating with the threads 45 in the block 15. This die 48 differs from the female die part 58 of FIG. 4 in that the narrowed section 51 of the central opening in the die part 48 (FIG. 3) is somewhat shorter than the narrowed section 60 of the opening in the die part 58 (FIG. 4). The remaining section 52 of the central opening is enlarged to provide a substantial annular space about the finished tube.

The male die part 47 has a flanged hexagonal end portion 54' formed integrally with the body of the die 47 and the inner section thereof is in the form of a cone 55 tapering generally uniformly from the left edge of the opening 43 to a point slightly within the narrow section 51 of the opening 42 in the female die part 48 at which point the cone is provided with a cylindrical portion 56 which extends into the female die part opening 51 for a distance equal to length of the narrowed section 51 of the female die part opening 52.

In the use of this form of the invention the same operating steps are involved except that upon the application of pressure by the rams 37 and 38 the plasticized lead 54 is forced outwardly through the space in the female die part defined by the cylindrical portion 56 and the opening 51 to form the lead tube 53.

It has been found that tubes, rods, bearings or the like or irregular contour can be clad by the form of the invention shown in FIG. 4 while at the same time realizing the advantages previously enumerated. Similarly, any desirable configuration may be extruded by the method and apparatus as discussed in connection with FIG. 3.

It will be seen that the present invention provides a mechanism for cladding rods, tubes, wires and the like with lead in which the clad is uniform and homogeneous; in which the apparatus and procedure is simple; and which requires no additional machinery for moving the rod to be clad or synchronizing the movement of the rod with the cladding operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A mechanism for cladding articles with a uniform and homogeneous clad, a thick-walled block having a die part-receiving passageway and a lead-receiving passageway extending therethrough, said die part receiving passageway and said lead-receiving passageway intersecting with each other within the block, a female die part and a male die part in opposite ends of said die part receiving passageway, said male die part and female die part having aligned openings extending therethrough to receive an article to be clad, said female die part and said male die part each having a body portion mounted entirely within the thick walls of said block and each having means outside said block to permit removal of the respective die part from said block, said male die part having a conical portion extending therefrom, said conical portion intersecting said lead-receiving passageway and extending into the opening in said female die part for a distance not exceeding the thickness of the clad to be formed, the opening in said female die part having a portion of reduced diameter, said portion of reduced diameter having a length greater than the thickness of the article is pushed through the die parts to form a uniform and ing passageway to force lead between said male and female die parts to form a clad on an article passing therethrough, the pressure exerted by said two plungers being sufficient to permit the lead to push an article through the openings in said male and female die parts, whereby the cladding will be synchronized with the rate the article is pushed throuh the die parts to form a uniform and homogeneous clad, two carriages, each carriage being on one of two opposed sides of said block, each carriage being attached to a respective one of said plungers to effect the movement thereof, two lead screws each journaled to a side of said block and each journaled at its ends in a suitable stationary support, each of said screws extending through both of said carriages, said screws having right handed threads along corresponding extents to mate with female threads in the same one of said carriages and having left handed threads along corresponding extents to mate with female threads in the other of said carriages, means to simultaneously rotate both screws in the same direction which may be either of the two possible directions, whereby rotation of said screws in one direction will advance said plungers toward one another to extrude and rotation in the other direction will withdraw said plungers away from each other and permit billet loading.

2. A mechanism as claimed in claim 1, wherein the length of the portion of reduced diameter of said female die part opening does not exceed eight times the thickness of the article to be clad and the conical portion of said male die part extends into the opening of said female die part for a distance of 1/32 of an inch and wherein said block is provided with means for heating the block to between 550 and 580 degrees Fahrenheit to maintain the lead in a semi-plastic state.

3. A mechanism for cladding articles with a uniform and homogeneous clad, a thick-walled block having a die part-receiving passageway and a lead-receiving passageway extending therethrough, said die part-receiving passageway and said lead-receiving passageway intersecting with each other within the block, a female die part and a male die part threadably mounted in opposite ends of said die part-receiving passageway, said male die part and female die part having aligned openings extending therethrough to receive an article to be clad, said female die part and said male die part each having a body portion mounted entirely within the thick walls of said block and each having means outside said block to permit removal of the respective die part from said block, the opening in said female die part having a portion of reduced diameter not exceeding eight times the thickness of the article being clad, said female die part having a flat inner surface adapted to be tangential to the wall of the lead-receiving passageway, said male die part having a conical portion extending therefrom, said conical portion only intersecting said lead-receiving passageway and extending into the opening in said female die part for a distance of 1/32 of an inch, heating elements in said block adapted to heat the lead at a temperature of between 550 and 580 degrees Fahrenheit and maintain it in a semi-plastic state, two opposed plungers in said lead-receiving passageway to force lead between said male and female die parts to form a clad on an article being passed therethrough, the pressure exerted by said two plungers being between 300 and 1000 tons per square inch and being sufficient to permit the lead to push an article through the openings in said male and female die parts, whereby the cladding will be synchronized with the rate the article is pushed through the die parts to form a uniform and homogeneous clad, two carriages, each carriage being on one of two opposed sides of said block, each carriage being attached to a respective one of said plungers to effect the movement thereof, two lead screws each journaled to a side of said block and each journaled at its ends in a suitable stationary support, each of said screws extending through both of said carriages, said screws having right hand threads along corresponding extents to mate with female threads in the same one of said carriages and having left handed threads along corresponding extents to mate with female threads in the other of said carriages, means to simultaneously rotate both screws in the same direction which may be either of the two possible directions, whereby rotation of said screws in one direction will advance said plungers toward one another to extrude and rotation in the other direction will withdraw said plungers away from each other and permit billet loading.

References Cited in the file of this patent

UNITED STATES PATENTS

| | | |
|---|---|---|
| 275,859 | Robertson | Apr. 17, 1883 |
| 431,295 | Tracy | July 1, 1890 |
| 670,611 | Hoffman | Mar. 26, 1901 |
| 2,084,149 | Larsen | June 15, 1937 |
| 2,320,801 | Simons | June 1, 1943 |
| 2,499,566 | Bouton et al. | Mar. 7, 1950 |

FOREIGN PATENTS

| | | |
|---|---|---|
| 373,984 | Great Britain | 1932 |
| 618,446 | Germany | Sept. 7, 1935 |
| 7,224 | Great Britain | 1901 |
| 770,547 | France | July 2, 1934 |